(12) United States Patent
Vijay et al.

(10) Patent No.: US 7,505,940 B2
(45) Date of Patent: Mar. 17, 2009

(54) SOFTWARE SUITE ACTIVATION

(75) Inventors: Shyam Sunder Vijay, Fremont, CA (US); Xuejun Xu, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 279 days.

(21) Appl. No.: 11/095,928

(22) Filed: Mar. 31, 2005

(65) Prior Publication Data

US 2006/0224520 A1    Oct. 5, 2006

(51) Int. Cl.
    *H04K 1/00* (2006.01)
(52) U.S. Cl. .......................................... 705/59; 705/51
(58) Field of Classification Search .................. 717/175, 717/169; 705/59
    See application file for complete search history.

(56) References Cited

U.S. PATENT DOCUMENTS

| | | | |
|---|---|---|---|
| 5,671,412 A * | 9/1997 | Christiano | 707/104.1 |
| 5,737,557 A * | 4/1998 | Sullivan | 715/765 |
| 7,222,106 B2 * | 5/2007 | Block et al. | 705/59 |
| 2004/0015955 A1 * | 1/2004 | Bourke-Dunphy et al. | 717/174 |

* cited by examiner

*Primary Examiner*—Andrew J. Fischer
*Assistant Examiner*—Nancy T Le
(74) *Attorney, Agent, or Firm*—Schwegman, Lundberg & Woessner, P.A.

(57) ABSTRACT

A method and a system perform software suite activation. In some embodiments, a method includes installing a software suite having a number of software products onto a computer device. If a copy of one of the number of software products is already activated on the computer device, the installing includes deactivating a license of the copy of the one of the number of software products. Additionally, if a copy of one of the number of software products is already activated on the computer device, the installing includes adopting, by the software suite, the copy of the one of the number of software products.

7 Claims, 3 Drawing Sheets

SOFTWARE SUITE ACTIVATION

TECHNICAL FIELD

The application relates generally to data processing, and, more particularly, to activation of software.

BACKGROUND

Upgrades to hardware may not always keep pace with upgrades to software and vice versa. Customers may upgrade their hardware at a rate that may outpace the upgrades to their software. Accordingly, customers may attempt to transfer their software on existing hardware to their upgraded hardware. However, allowing the ability to transfer must be weighed against massive distribution of a single copy of the software across a number of different machines.

Moreover, software products may come in a variety of different packages. Customers may purchase an individual product. Customers may also purchase a suite of software that includes a number of different individual products as well as a number of add-ons to provide an incentive for purchasing the suite (instead of the individual products).

SUMMARY

According to some embodiments, a method and a system perform software suite activation. In some embodiments, a method includes installing a software suite having a number of software products onto a computer device. If a copy of one of the number of software products is already activated on the computer device, the installing includes deactivating a license of the copy of the one of the number of software products. Additionally, if a copy of one of the number of software products is already activated on the computer device, the installing includes adopting, by the software suite, the copy of the one of the number of software products.

In some embodiments, a method includes installing a software suite having one or more software products onto a machine. Upon determining that a copy of at least one of the one or more software products is already activated on the machine, the installing changing a serial number of the copy of the at least one of the one or more software products to match a serial number of the software suite. Additionally, upon determining that a copy of at least one of the one or more software products is already activated on the machine, the installing includes redirecting a license of the copy of the at least one of the one or more software products to a license of the software suite.

In some embodiments, an apparatus includes a machine-readable medium to store a first copy of a software product installed and activated for execution on the apparatus. The apparatus also includes an input/output (I/O) logic to receive a copy of a software suite that includes a number of software products including a second copy of the software product. The apparatus includes an adoption logic to cause an adoption of the first copy of the software product by the copy of the software suite.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures.

In the drawings.

DETAILED DESCRIPTION

Methods, apparatus and systems for software suite activation are described. In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration.

In some embodiments, copies of software products or a suite of software products may include a limited license based on a serial number. In other words, a copy of a software product may not be activated on an unlimited number of machines. A suite of software products may include one or more software products. While a copy of a software product or suite of software may be installed on any of a number of machines, in some embodiments, the copy of a software product or suite of software may only be activated on a limited number of machines. An activation may require communication with a server over a network to allow for execution based on a serial number and other data that uniquely identifiers the machine (such as a machine disk identifier (MDI)). In some embodiments, an activation may be transferred to different machines. For example, if customers purchase a new machine, the customers may transfer the activation from an old machine to this new one. This transfer activation may be performed by the server.

For some embodiments, a first copy of the software product (software product A) may be currently activated on a machine. A user of the machine may attempt to activate a software suite (having a number of individual copies of software products, which includes a second copy of the software product A) on the same machine. Some embodiments provide for an adoption of the first copy of the software product A by the software suite in terms of licensing. In some embodiments, as part of the adoption, the license of the first copy of the software product A is transferred to the software suite. Additionally, in some embodiments, as part of the adoption, the serial number of the first copy of the software product A is changed to the serial number of the software suite. Moreover, in some embodiments, the first copy of the software product A is deactivated prior to the adoption by the software suite. Accordingly, the first copy of the software product A may be used on a different machine. In some embodiments, activation of the first copy of software product A is transferred to a different machine prior to the adoption by the software suite.

Figure 1:
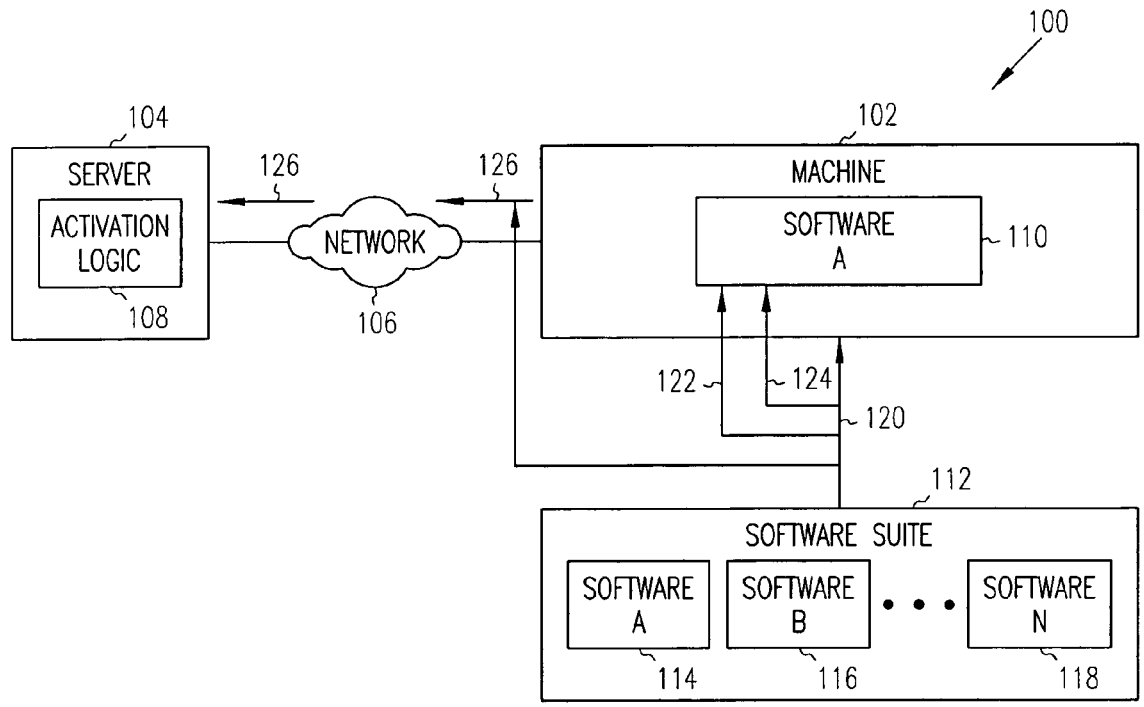
FIG. 1 illustrates a system for software suite activation, according to some embodiments of the invention.

FIG. 1 illustrates a system for software suite activation, according to some embodiments of the invention. In particular, FIG. 1 illustrates a system 100 that includes a machine 102 that is coupled to a server 104 through a network 106. The machine 102 may be representative of any apparatus, computer device, etc. For example, the machine 102 may be a desktop computer, notebook computer, Personal Digital Assistant (PDA), a cellular telephone, etc. The machine 102 includes a software product A 110 that has been installed and activated thereon. The server 104 includes an activation logic 108. A more detailed description of an architecture of the machine 102 and/or the server 104, according to some embodiments, is set forth below. While FIG. 1 employs a client-server architecture, embodiments are not limited to such an architecture. For example, some embodiments may be incorporated into a distributed or peer-to-peer architecture system. The network 106 may be different types of networks including a Local Area Network, Wide Area Network, etc. For example, the network 106 may be the Internet, an Intranet network, an Ethernet-based network, etc.

FIG. 1 also includes a number of operations that may be part of the activation of a software suite 112. The operations include an installation of suite operation 120, a serial number change operation 122, a license redirect operation 124 and a deactivation operation 126. As shown, a software suite 112 is being installed on the machine 102 (the installation of suite operation 120). In some embodiments, the activation of the software suite 112 may be part of an installation of the software suite 112 on the machine 102. The software suite 112 may be installed based on a CD-ROM (Compact Disk-Read Only Memory) disk through an input/output (P/O) device, based on a download from a server over the network 106, etc. In some embodiments, the software suite 112 may have already been installed. Therefore, the activation is separate from the installation of the software suite 112.

As shown, the installation of suite operation 120 may cause three other operations—the deactivation operation 126, the serial number change operation 122 and the license redirect operation 124. With regard to the deactivation operation 126, the installation of the software suite 112 may cause the software A product 110 to be deactivated. This deactivation may include communications with the server 104. The activation logic 108 therein may deactivate the license of the software A product 110 for the machine 102. In particular, as described above, in some embodiments, a license of a given software product has a limited number of activations. Accordingly the software product may execute on a limited number of machines. Therefore, in some embodiments, prior to execution, the software product must be activated by the activation logic 108 in the server 104.

The activation logic 108 may track activations based on a unique identification of the machine or a component therein. For example, in some embodiments, the unique identification may be a machine disk identifier. The machine disk identifier is a value that is calculated based on information related to the hard disk drive (e.g., identifications of sectors or tracks of the hard disk drive). The activation logic 108 may also track activations based on an identification of a processor of the machine, the amount of memory, etc. In some embodiments, the activation logic 108 may also track activations based on any combination of those identifications listed above. The activation logic 108 may store these unique identifications along with a unique serial number for the license of the software product into a data structure on a machine-readable medium that is part of the server 104 (not shown in FIG. 1).

With regard to the serial number change operation 122, the installation of the software suite 112 may cause a serial number of the software A product 110 to be changed to a serial number of the software suite 112. In particular, the serial number for the software A product 110 may be stored within files stored on a machine-readable medium (not shown) of the machine 102.

With regard to the license redirection operation 124, the installation of the software suite 112 may cause any operations on the license of the software A product 110 to be redirected to be performed for the license of the software suite 112. Moreover, any operation on the license of the software suite 112 is also performed on the license of the software product A. Therefore, if the license of the software suite 112 is deactivated, transferred, etc., the same operation is performed for the license of the software A product 110.

Figure 2:
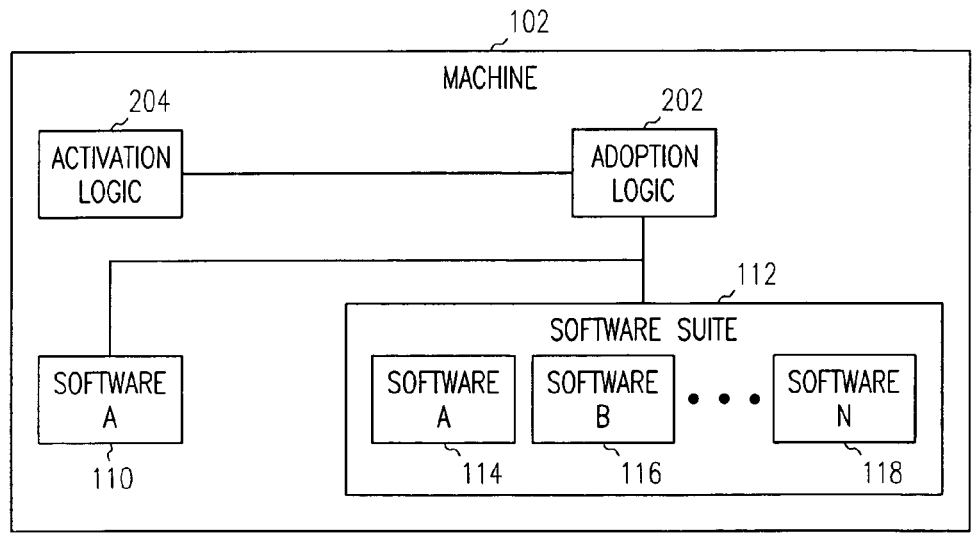
FIG. 2 illustrates a more detailed block diagram of a machine on which a software suite is activated, according to some embodiments of the invention.

FIG. 2 illustrates a more detailed block diagram of a machine on which a software suite is activated, according to some embodiments of the invention. In particular, FIG. 2 illustrates a more detailed block diagram of the machine 102 of FIG. 1. As shown, the machine 102 includes installed copies of the software product A 110 and the software suite 112. The machine also includes an adoption logic 202, an activation logic 204 and an install logic. The adoption logic 202, the activation logic 204 and the install logic may be representative of software, hardware, firmware or a combination thereof. For example, the adoption logic 202, the activation logic 204 and the install logic may be software to be executed on a processor (not shown). An example of the machine 102 having this architecture is described in FIG. 4 below. Subsequent to activation, the software product A 110 and the software product A 114, the software product B 116 and the software product N 118 may also execute on a similar processor.

Figure 3:
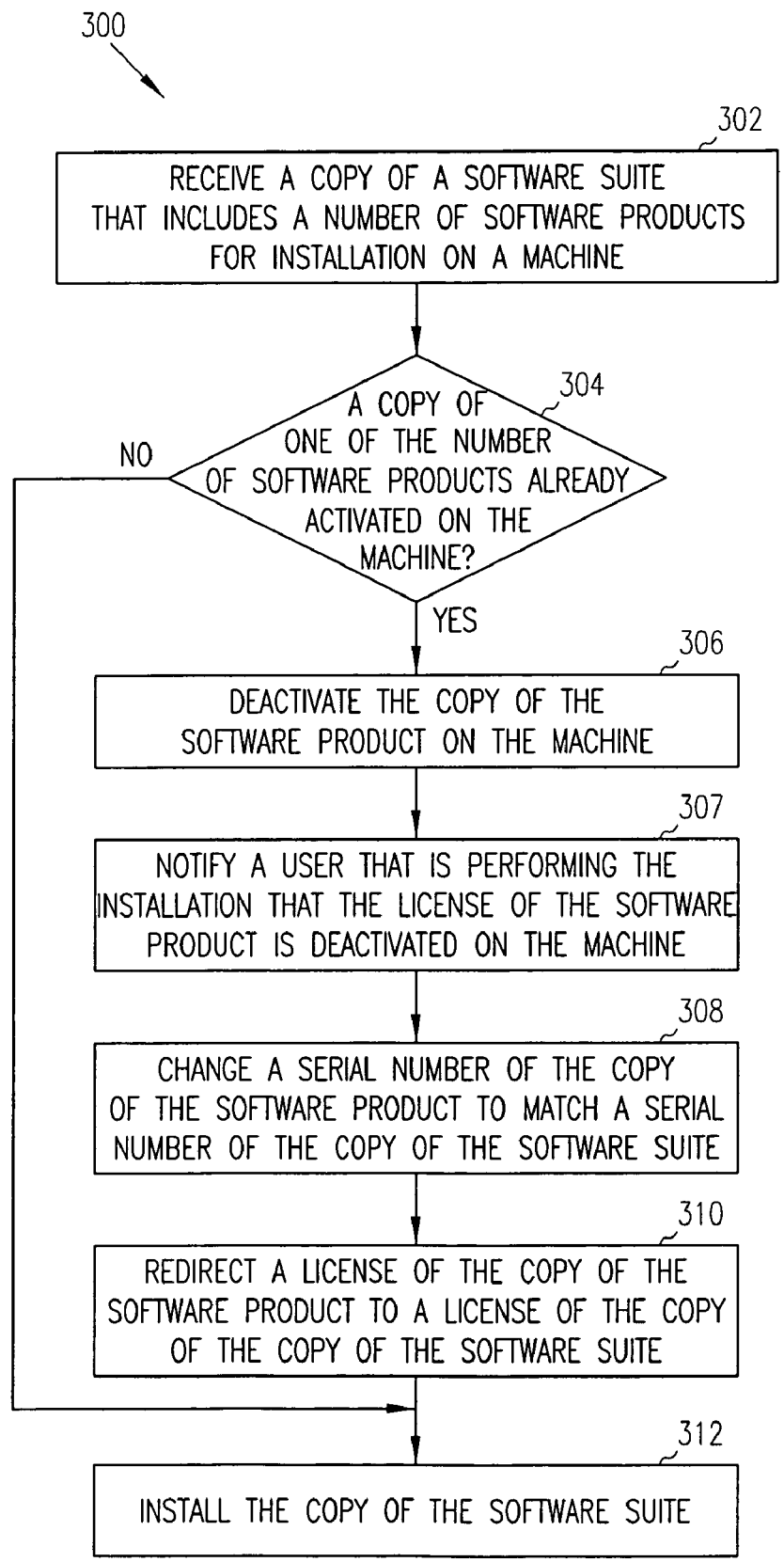
FIG. 3 illustrates a flow diagram for software suite activation, according to some embodiments of the invention.

A more detailed description of the operations for software suite activation, according to some embodiments, is now described. FIG. 3 illustrates a flow diagram for software suite activation, according to some embodiments of the invention. The flow diagram 300 illustrates the operations for activating a software suite having a number of individual software products on a machine. Moreover, such operations are described wherein a copy of one of the individual software products is already activated on the machine. Such operations may be performed for a greater number of activated individual software products. The flow diagram 300 is described with reference to the components of FIGS. 1 and 2. The flow diagram 300 commences at block 302.

Figure 4:
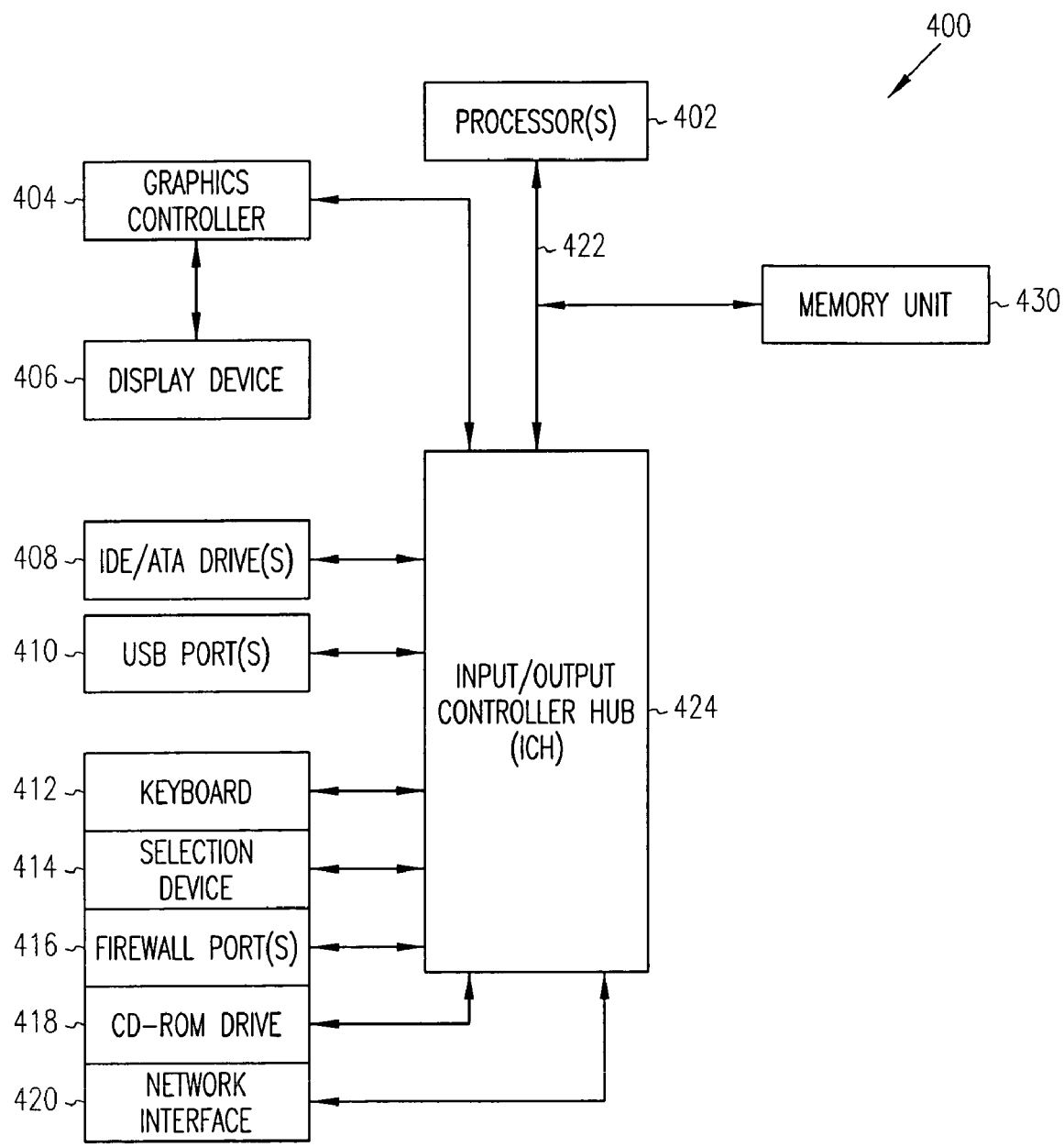
FIG. 4 illustrates a computer device that executes software for performing operations related to software suite activation, according to some embodiments of the invention.

At block 302, the activation logic 204 of a machine may receive a copy of a software suite (that includes a number of software products) for installation on the machine. With reference to FIGS. 1 and 2, the machine 102 may include an I/O logic for receiving the copy of the software suite 112 for installation. Examples of different I/O logic are shown in FIG. 4 that is described below. The flow continues at block 304.

At block 304, the adoption logic 202 determines whether a copy of one of the number of software products is already activated on the machine. In some embodiments, the adoption logic 202 may make this determination based on the existence of a file stored on the hard disk drive of the machine 102, the setting of a flag in a file that is part of the installation of the software product, etc. In some embodiments, the adoption logic 202 may make this determination based on a query to the activation logic 108 on the server 104 over the network 106. Upon determining that a copy of one of the number of software products is not already activated on the machine 102, the flow continues at block 312, which is described in more detail below.

At block 306, upon determining that a copy of one of the number of software products is already activated on the machine 102, the activation logic 204 deactivates the copy of the software product on the machine 102. With reference to FIGS. 1 and 2, the activation logic 204 communicates a deactivation message (deactivation operation 126) to the server 126. The activation logic 104 of the server 126 may deactivate the license of the copy of the software product A 110 for the machine 102. For example, the activation logic 104 may update a data structure that tracks the number of activations for a given serial number as well as the identification of the machine 102. Accordingly, even if the license of copy of the software product A 110 has a limited number of activations, the copy may be activated on a different machine. Therefore, the individual copy of the software products is not adopted by the software suite prior to deactivation, thereby allowing for reuse of the license of the software product A 110. The flow continues at block 307.

At block 307, the adoption logic 202 notifies a user that is performing the installation of the software suite that the license of the software product A 110 is now deactivated on the machine 102. The adoption logic 202 may also notify the user that the license is now available for use on a different machine. This notification may be through a pop-message during the activation, an email message, a telephone call, etc. The flow continues at block 308.

At block 308, the adoption logic 202 changes a serial number of the copy of the software product A 110 to a match a serial number of the copy of the software suite. With reference to FIGS. 1 and 2, the serial numbers may be stored in one or more locations in files in storage on the machine 102. Accordingly, the adoption logic 202 updates the serial number in those locations. The flow continues at block 310.

At block 310, the adoption logic 202 redirects a license of the copy of the software product A 110 to a license of the copy of the software suite. With reference to FIGS. 1 and 2, the adoption logic 202 may perform this redirection based on creation of a file, setting a flag in a file, etc. Therefore, if a change is to occur to a license of the software suite 112, the same change will be made to the license of the copy of the software A product 110 and vice versa. Logic that is to make changes to the license may be updated accordingly. For example, if the license of the software suite 112 is to be transferred to a different machine, to be deactivated, etc., the logic to perform this operation may check for the existence of a certain file. Upon determining that this file exists, the logic may perform the same operation to the license of the software A product 110. The flow continues at block 312.

At block 312, the activation logic 204 activates the copy of the software suite. With reference to FIGS. 1 and 2, the activation logic 204 may activate the copy of the software suite 112 by sending an activation message to the server 108. The server 108 may determine whether the copy of the software suite 112 may be activated. For example, the server 108 may include activation counters for the different copies of the software suites that are tracked based on serial numbers. Therefore, if the copy of the software suite 112 has already been activated for a set limit, the activation logic 108 may deny activation and transmit a deny message back to the machine 102. If the copy of the software suite 112 is below the set limit, the activation logic 108 updates its number of activations for this copy of the software suite and sends an activation message back to the machine 102.

Embodiments are not limited to the operations shown in the flow diagram 300. For example, in some embodiments, the activation of the software suite may cause the adoption of the individual copy of the software product but not cause the deactivation of the individual copy of the software product. Alternatively, in some embodiments, the activation of the software suite may cause the deactivation of the individual copy of the software product, but not cause the adoption of the individual copy of the software product.

An embodiment wherein software performs operations related to the software suite activation as described herein is now described. In particular, FIG. 4 illustrates a computer device that executes software for performing operations related to software suite activation, according to some embodiments of the invention. FIG. 4 illustrates a computer device 400 that may be representative of the machine 102 or the server 104.

As illustrated in FIG. 4, the computer system 400 comprises processor(s) 402. The computer system 400 also includes a memory unit 430, processor bus 422, and Input/Output controller hub (ICH) 424. The processor(s) 402, the memory unit 430, and the ICH 424 are coupled to the processor bus 422. The processor(s) 402 may comprise any suitable processor architecture. The computer system 400 may comprise one, two, three, or more processors, any of which may execute a set of instructions in accordance with embodiments of the invention.

The memory unit 430 may store data and/or instructions, and may comprise any suitable memory, such as a random access memory (DRAM). For example, the memory 430 may be a Synchronous RAM (SRAM), a Synchronous Dynamic RAM (SDRAM), DRAM, a double data rate (DDR) Synchronous Dynamic RAM (SDRAM), etc. The computer system 400 also includes IDE drive(s) 408 and/or other suitable storage devices. A graphics controller 404 controls the display of information on a display device 406, according to some embodiments of the invention.

The input/output controller hub (ICH) 424 provides an interface to I/O devices or peripheral components for the computer system 400. The ICH 424 may comprise any suitable interface controller to provide for any suitable communication link to the processor(s) 402, memory unit 430 and/or to any suitable device or component in communication with the ICH 424. For one embodiment of the invention, the ICH 424 provides suitable arbitration and buffering for each interface.

For some embodiments of the invention, the ICH 424 provides an interface to one or more suitable integrated drive electronics (IDE) drives 408, such as a hard disk drive (HDD) or compact disc read only memory (CD ROM) drive, or to suitable universal serial bus (USB) devices through one or more USB ports 410. For one embodiment, the ICH 424 also provides an interface to a keyboard 412, mouse 414, CD-ROM drive 418, or other suitable devices through one or more firewire ports 416. In some embodiments, the ICH 424 also provides a network interface 420 though which the computer system 400 can communicate with other computers and/or devices. The ICH 424 is connected to a wireless interface, which enables the computer system 400 to wirelessly connect to computing devices using any suitable wireless communication protocol (e.g., 802.11b, 802.11g, etc.).

In some embodiments, the computer system 400 includes a machine-readable medium that stores a set of instructions (e.g., software) embodying any one, or all, of the methodologies described herein. Furthermore, software can reside, completely or at least partially, within memory unit 430 and/or within the processor(s) 402.

With reference to FIGS. 1 and 2, the memory 430 and/or one of the IDE/ATA drives 408 may store the adoption logic 202, the activation logic 204, the activation logic 108, the software product A 110, the software product A 114, the software product B 116 and the software product N 118. In some embodiments, the adoption logic 202, the activation logic 204, the activation logic 108, the software product A 110, the software product A 114, the software product B 116 and the software product N 118 may be instructions executing within the processor(s) 402. Therefore, the adoption logic 202, the activation logic 204 and the activation logic 108 may be stored in a machine-readable medium that are a set of instructions (e.g., software) embodying any one, or all, of the methodologies described herein. For example, the adoption logic 202, the activation logic 204 and the activation logic 108 may reside, completely or at least partially, within the memory 430, the processor(s) 402, one of the IDE/ATA drive(s) 408, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for software suite activation, in accordance with some embodiments of the invention. A flow diagram illustrates the operations for software suite activation, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   installing a software suite having a number of software products onto a machine, wherein the installing includes performing the following operations upon determining that a copy of one of the number of software products is already activated on the machine:
   changing a serial number of the copy of the one of the number of software products to match a serial number of the software suite; and
   redirecting a license of the copy of the one of the number of software products to a license of the software suite.

2. The method of claim 1, wherein the performing of the following operations further comprises deactivating a license of the copy of the one of the number of software products on the machine.

3. The method of claim 1, wherein the performing of the following operations further comprises notifying a user, causing the installing of the software suite, that the license of the copy of the one of the number of software products is being deactivated.

4. A method comprising
   installing a software suite having a number of software products onto a computer device, wherein the installing includes performing the following operations
   if a copy of one of the number of software products is already activated on the computer device:
   deactivating a license of the copy of the one of the number of software products; and
   adopting, by the software suite, the copy of the one of the number of software products.

5. A machine-readable medium that provides instructions which, when executed by a machine, cause said machine to perform operations comprising:
   installing a software suite having a number of software products onto a machine, wherein the installing includes performing the following operations upon determining that a copy of one of the number of software products is already activated on the machine:
   changing a serial number of the copy of the one of the number of software products to match a serial number of the software suite; and
   redirecting a license of the copy of the one of the number of software products to a license of the software suite.

6. The machine-readable medium of claim 5, wherein the performing of the following operations further comprises deactivating a license of the copy of the one of the number of software products on the machine.

7. The machine-readable medium of claim 5, wherein the performing of the following operations further comprises notifying a user, causing the installing of the software suite, that the license of the copy of the one of the number of software products is being deactivated.

* * * * *

UNITED STATES PATENT AND TRADEMARK OFFICE
CERTIFICATE OF CORRECTION

| | | |
|---|---|---|
| PATENT NO. | : 7,505,940 B2 | Page 1 of 1 |
| APPLICATION NO. | : 11/095928 | |
| DATED | : March 17, 2009 | |
| INVENTOR(S) | : Vijay et al. | |

It is certified that error appears in the above-identified patent and that said Letters Patent is hereby corrected as shown below:

In column 3, line 28, delete "(P/O)" and insert -- (I/O) --, therefor.

Signed and Sealed this

Twenty-sixth Day of May, 2009

JOHN DOLL
*Acting Director of the United States Patent and Trademark Office*